Patented July 7, 1931

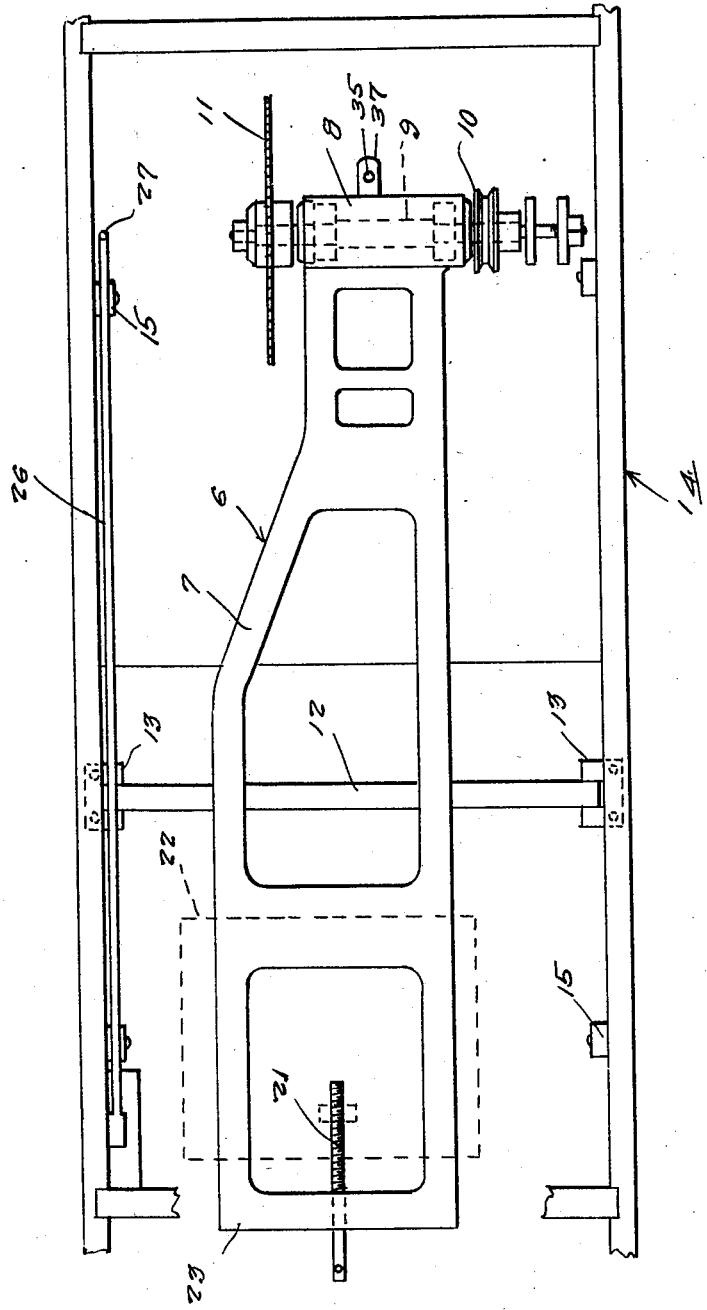

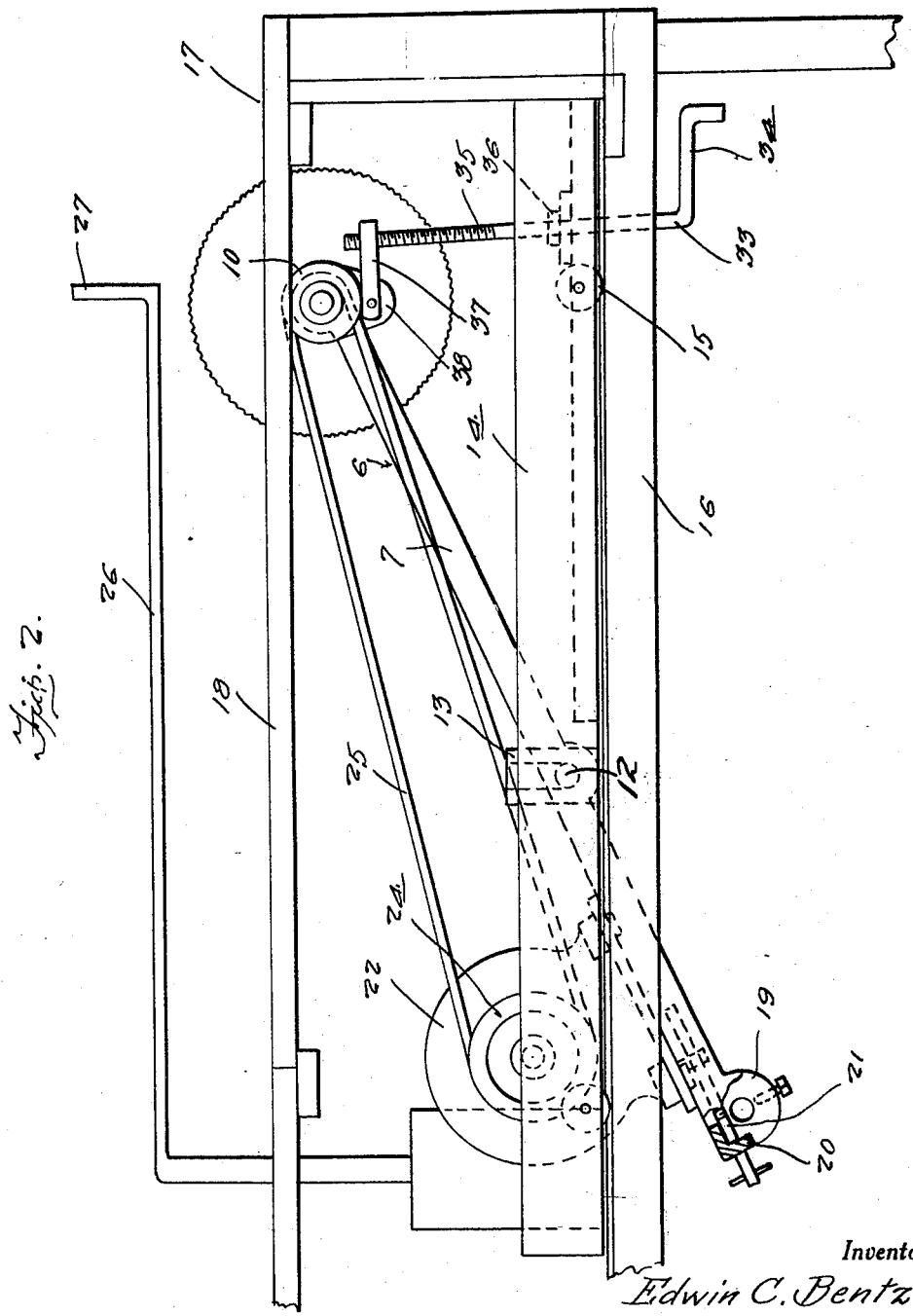

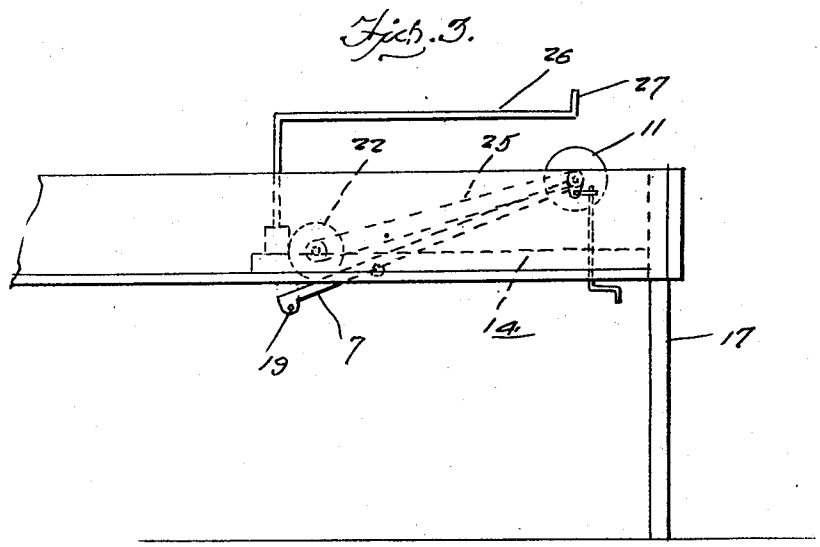
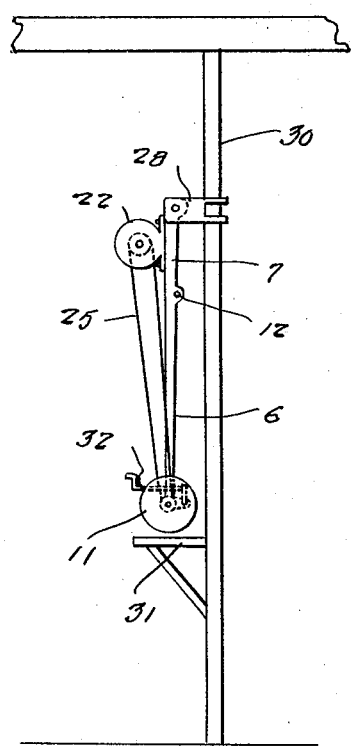
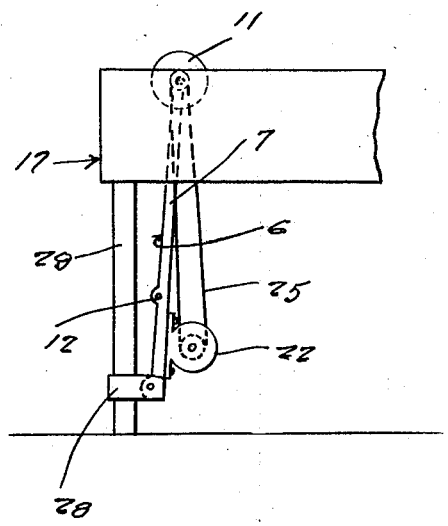

1,813,435

UNITED STATES PATENT OFFICE

EDWIN C. BENTZ, OF GLENDALE, CALIFORNIA

ROTARY SAW

Application filed June 17, 1929. Serial No. 371,533.

This invention relates to an improved rotary saw which is especially but not necessarily adapted for building and construction work where it is desirable to saw boards, planks, flooring, studding, and the like.

More specifically stated, the invention has reference to a portable self-contained rotary saw, which is of light weight construction to adapt it to be readily placed in position and removed and transported from job to job by a carpenter in order to facilitate the cutting of building materials.

In carrying the invention into actual effect I have evolved and produced an economical and simplified structural organization of parts, which is characterized principally by an electro-mechanical unit, which constitutes the portable part of the invention and which is usable in a diversified manner to render the structure convertible, whereby to permit boards to be sawed by moving the saw in a horizontal plane against the board or to permit a suspended and swingable saw arrangement for moving the saw against the work.

The specific details and their special co-action and cooperation will become more readily apparent from the following description and drawings.

In the drawings:

Figure 1 is a top plan view of the roller equipped carrier on which the saw unit is removably and pivotally supported to travel with the carriage in a horizontal plane.

Figure 2 is a side elevational view of a bench, the carrier thereon and saw units associated with these details.

Figure 3 is a reduced side elevational view of the same general arrangement.

Figure 4 is a fragmentary end view of the table or bench showing the manner in which the saw unit is disposed in a vertical or upright position for operation.

Figure 5 is a view showing the saw units reversed with respect to Figure 4 and depending to be operated as a swinging saw.

The principal part of the invention, as before indicated is the electromechanical portable saw unit. This is of a self-contained type and weighs substantially sixty-five pounds whereby to permit it to be conveniently handled and carried from job to job in an ordinary automobile, thus adapting it for expeditious work and rendering it expressly useful for employment by carpenters. This unit is generally designated by the reference character 6 in Figure 1. As here shown it comprises a beam 7 in the form of a mechanical casting of the top plan configuration, here represented. One end is reduced somewhat and provided with a transversely disposed bearing 8, in which a shaft 9 is mounted for rotation. On one end of the shaft is a belt pulley 10.

On the opposite end is the rotary saw blade 11. Formed integral with the central portion of this beam is the right angularly disposed rock shaft 12 adapted to be removably mounted in bearings 13 in the frame 14 of a carrier. The carrier, as represented in Figure 1, is in the form of a shallow frame having suitable supporting rollers 15 adapted to move on the horizontal rails 16 of a work bench generally designated by the reference character 17. This work bench is provided with a top 18 having an opening to accommodate the saw blade. At the lower left hand end of the casting 7, in Figure 2 is an attaching and bearing bracket 19. Also adjacent this end is a downturned flange 20 accommodating an operating screw 21. This screw is operatively connected with a slidably mounted electric motor 22, mounted on the portion 23 of the beam. This motor is provided with a pulley 24 over which the belt 25 is trained. The belt is also trained over the first named pulley 10, whereby to provide a self-contained portable structure of an electromechanical type, which as before stated, is bodily removable to permit easy handling and transportation.

In the embodiment of the invention shown in Figure 2, the shaft 12 is rockably mounted in the bearing 13 to permit the saw blade to be raised above the table top 18 and to permit the saw and the carrier as a unit to be moved back and forth along the bench.

To facilitate this operation, I provide an appropriate operating handle 26. This has an upturned hand grip 27. Hence, instead of moving the work against the saw, the saw is moved against the work by sliding the saw back and forth.

It is not practical however to use the saw under all conditions in the position seen in Figures 1, 2, and 3. Hence under some conditions, the entire unit is transposed and employed as seen in Figure 4. Here we observe an attaching clamp 28 which is fastened to the legs 29 of the bench and constructed to accommodate the aforesaid attaching bracket 19. Thus the beam is disposed vertically and the saw at the top is here shown so that it may be swung toward and from the operator.

A similar arrangement is utilized in Figure 5, wherein the reference character 30 designates a post and 31 a shelf. Here the clamp 28 is attached to the post so that the structure is suspended downwardly and in this way a swingable hanging saw is provided. In this arrangement, the reference character 32 designates an appropriate operating handle.

It is thought that by carefully considering the description in conjunction with the drawings, persons skilled in the art to which the invention relates will be able to obtain a clear understanding of the same. Therefore a more lengthy description is regarded as unnecessary.

As seen in Figure 2, the reference character 33 designates a vertical adjusting shaft having a hand crank 34 on one end and having its opposite end screw threaded as at 35. The intermediate portion is passed through an appropriate guide on the carrier frame 14. The screw threaded end is connected through the medium of the elements 37 and 38 with the shaft 9, whereby to permit the saw to be raised above the table top 18 or be lowered below it and disposed out of the way when not in use.

Minor changes in the shape, size and rearrangement of details coming within the field of invention claimed may be resorted to, in actual practice, if desired.

What is claimed is:

In a structure of the class described, in combination, a work bench, a pair of spaced, parallel rails disposed below the bench and spaced therefrom, a wheel equipped carriage slidably mounted for longitudinal movement on the rails, an operating handle for said carriage, said carriage including a frame having centrally disposed substantially U-shaped bearings mounted thereon, a portable saw unit removably mounted on the carriage and comprising a beam having an integral transverse shaft removably mounted for oscillation in the bearing, a rotary saw mounted for operation on one end portion of the beam, an electric motor adjustably mounted for longitudinal movement on the opposite end portion of the beam, means for operatively connecting the rotary saw to the electric motor for actuation thereby, an adjusting screw mounted for operation in one end portion of the beam and operatively connected to the electric motor for shifting the same longitudinally and maintaining said motor in adjusted position on the beam, and an adjusting screw mounted for operation on the carriage and operatively connected to the beam in a manner to rock said beam on the carriage and maintain the same in adjusted position.

In witness whereof I affix my signature.

EDWIN C. BENTZ.